May 27, 1941.　　　H. E. SPOONER　　　2,243,768
EYEGLASS CONSTRUCTION
Original Filed April 19, 1940　　　2 Sheets-Sheet 1
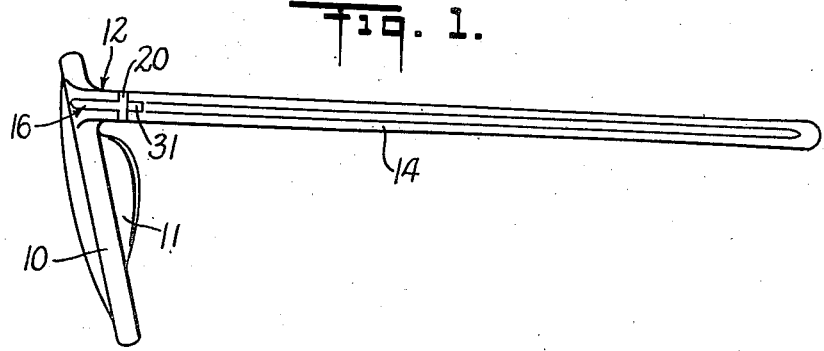
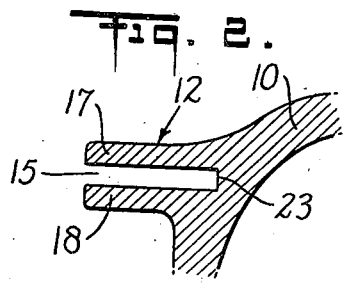
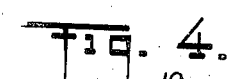
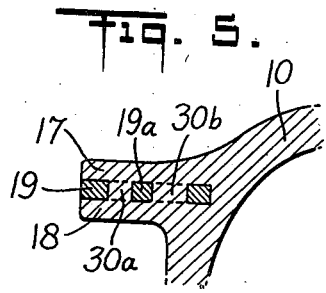
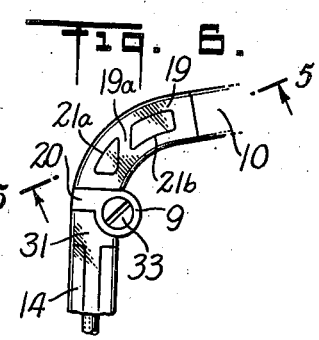
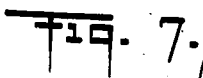
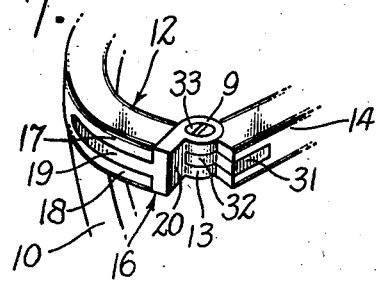
Inventor
Howard E. Spooner
by
Blair, Curtis & Hayward
Attorneys May 27, 1941.  H. E. SPOONER  2,243,768
EYEGLASS CONSTRUCTION
Original Filed April 19, 1940  2 Sheets-Sheet 2
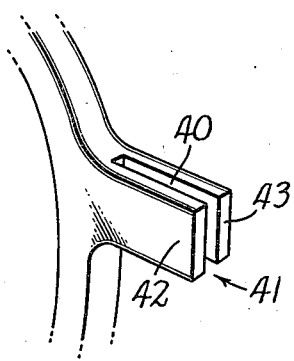
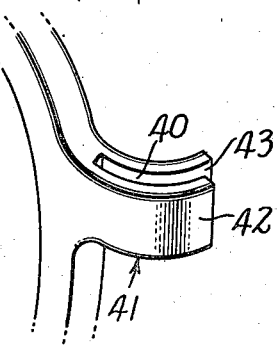
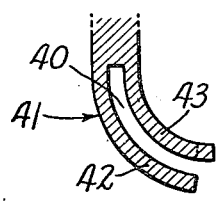
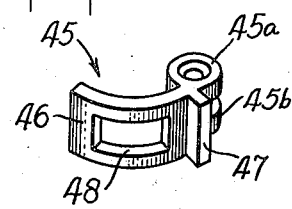
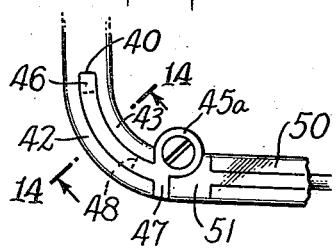
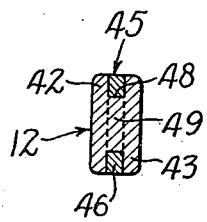
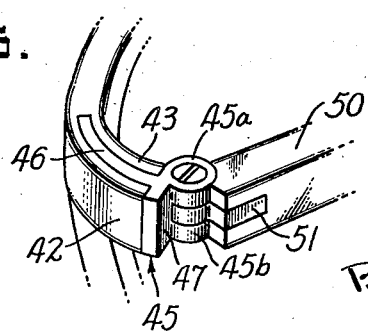
Inventor
Howard E. Spooner
by
Blair Curtis + Hayward
Attorneys

Patented May 27, 1941

2,243,768

UNITED STATES PATENT OFFICE 2,243,768

EYEGLASS CONSTRUCTION

Howard E. Spooner, Attleboro, Mass., assignor to Bay State Optical Company, Attleboro, Mass., a corporation of Maine Original application April 19, 1940, Serial No. 330,447. Divided and this application November 22, 1940, Serial No. 366,560

7 Claims. (Cl. 88—53)

This invention relates to non-metallic eyeglass frame construction.

One of the objects of this invention is to provide an eyeglass construction which will be neat and attractive in appearance. Another object is to provide a construction of the above character which may be easily manufactured with a minimum amount of labor and from inexpensive materials. Another object is to provide a construction of the above character which will be simple, practical, and thoroughly durable. Another object is to provide a construction of the above character in which the rim and temple connection may be easily and quickly assembled. Another object is to provide a construction of the above character wherein the metallic parts are concealed to a great extent to give a pleasing effect. Another object is to provide a construction of the above character wherein the metal parts are reliably secured to the plastic material. Other objects will be in part obvious and in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which are shown one or more of the various possible embodiments of my invention, Figure 1 is side elevation of an eyeglass frame having the features of my invention embodied therein;

Figure 2 is a vertical sectional view, on an enlarged scale, of a portion of the frame prior to assembly;

Figure 3 is a perspective view of inserts which become portions of the frame during assembly;

Figure 4 is a perspective view, on an enlarged scale, of a metallic fitting used in the frame;

Figure 5 is a vertical sectional view taken along the line 5—5 of Figure 6;

Figure 6 is top plan view, on an enlarged scale, of a portion of the frame shown in Figure 1;

Figure 7 is a fragmentary perspective view, on an enlarged scale, of a portion of the frame shown in Figure 1;

Figure 8 is a perspective view of another embodiment of my invention showing a portion of an eyeglass frame before assembly;

Figure 9 is a perspective view of the portion of a frame shown in Figure 8 with the shape of certain parts altered prior to assembly;

Figure 10 is a horizontal sectional view through the portion of the frame shown in Figure 9;

Figure 11 is a perspective view of an insert which becomes a portion of the frame during assembly;

Figure 12 is a perspective view of a fitting used in the frame;

Figure 13 is a top plan view of the end portion of the frame as assembled;

Figure 14 is a vertical sectional view taken along the line 14—14 of Figure 13; and Figure 15 is a fragmentary perspective view of the end portion of the frame as assembled.

Similar reference characters refer to similar parts throughout the several views of the drawings.

The present application is a division of my copending application, filed April 19, 1940, Serial No. 330,447, for an eyeglass frame construction and a method of connecting metal parts thereto.

As conducive to a clearer understanding of certain features of this invention, it might here be pointed out that in making eyeglass frames formed from a non-metallic material, such as Zylonite or the like, it is necessary to secure metallic parts thereto at various points. This necessity arises from the fact that plastic materials are not strong enough to perform certain functions, such as forming the hinge connection between the temple and the frame to which it is attached. Plastic materials are usually partially or completely transparent so that the parts forming the connection can be easily seen; thus, in the past, the bulkiness of the structure and the manner of attaching metallic fittings to non-metallic frames detracted from the appearance of the frame. Further, difficulty has been experienced in connecting the metallic parts to the frame and the temple so that they will withstand the strains encountered in use. One of the objects of this invention is to provide a construction which overcomes the above difficulties, as well as many others.

It might here be noted that reference hereinafter to an "outward" direction signifies a direction to the left or right of the bridge of an eyeglass frame in the direction of the temples, while the term "inward" denotes a direction opposite thereto. A "rearward" direction refers to a direction toward the face of the wearer, whereas the term "forward" denotes the opposite direction. An "upward" direction refers to a direction upwardly from the face of the wearer, while a "downward" direction is opposite thereto.

Referring now to Figure 1, in which a side elevation of a non-metallic eyeglass frame is shown, rim 10 has a nose guard 11 and a preferably integral endpiece 12 formed thereon. Endpiece 12 is curved outwardly and rearwardly (see also Figure 7) and is connected by a metallic fitting, generally indicated at 16, to a temple 14.

In Figure 2, endpiece 12 is shown before its connection to metallic fitting 16. The endpiece is provided with a slot 15, which is substantially in a horizontal plane with respect to the normal position of the frame when worn, and which makes endpiece 12 comprise two horizontally disposed tongues 17 and 18.

Referring now to Figure 4, metallic fitting 16 includes a curved flat tongue portion 19 having substantially the same thickness, width, and shape as slot 15. On the outer end of fitting 16 is provided a cover portion 20, which, when tongue portion 19 is within slot 15 (Figure 7), covers the outer end of endpiece 12 (see also Figure 6). As best seen in Figures 4 and 6, tongue portion 19 has a pair of openings 21a and 21b extending therethrough in its central section which are separated by a rib 19a. Rib 19a is preferably perpendicular to cover portion 20 and serves a purpose which will be more fully described hereinafter.

Openings 21a and 21b are adapted to snugly receive inserts 30a and 30b (Figure 3) of plastic material, such as Zylonite, which have substantially the same dimensions as these openings. To connect fitting 16 to endpiece 12, Zylonite inserts 30a and 30b are placed in openings 21a and 21b, and both the tongue portion 19 and the exposed surfaces of inserts 30a and 30b are coated with a priming lacquer having a cellulose base, which is allowed to dry. Then, a Zylonite solvent, such as ethyl acetate, is applied to tongue portion 19, the exposed surfaces of inserts 30a and 30b, and the sides of slot 15. When this solvent has reduced the Zylonite and lacquer surfaces to which it was applied to a fusible state, the tongue portion 19 with inserts 30a and 30b therein is placed in slot 15 between tongues 17 and 18.

When fitting 16 is properly positioned with respect to endpiece 12 with the end 22 of tongue portion 19 abutting the surface 23 at the end of slot 15, the tongues 17 and 18 are pressed together against tongue portion 19 and inserts 30a and 30b. This forces the surfaces of the parts coated with solvent into contact with each other, and they fuse together as the solvent evaporates. Inserts 30a and 30b become an integral part of tongues 17 and 18, and the Zylonite surfaces contacting fitting 16 are secured thereto by fusing to the layer of lacquer covering the fitting.

Thus, integral portions of endpiece 12 extend through fitting 16, firmly locking fitting 16 thereto. Furthermore, the main portion of fitting 16 is hidden from view in the interior of the endpiece if the frame is made from a non-transparent plastic, while, if the frame is made from a transparent plastic, the fitting is small and free of protruding portions. Thus, fitting 16 is secured to endpiece 12 by a strong connection which, at the same time, is neat and attractive in appearance.

Referring now to Figures 1, 6, and 7, temple 14 is preferably made of a plastic material, such as Zylonite, and has a metallic rod extending longitudinally thereof in its center. A cover member 31 is connected to the exposed end of this rod, having an ear 32 formed thereon. Ear 32 is adapted to fit between a pair of ears 9 and 13 formed on fitting 16, and a screw is passed through these ears to form a hinged connection between the temple and fitting 16. Ears 9, 13, and 32 are positioned so that the center of screw 33, which forms the axis of the hinge, is in alignment with the inside (right side in Figure 6) of temple 14. As the temple hinges about this axis, its movement in an outward direction (clockwise in Figure 6) is limited by cover member 31 abutting against cover member 20.

When the frame is in use, strains upon the connection of the fitting to the frame are exerted by upward, downward, and outward movements of the temples. When a temple is moved upwardly or downwardly, it is important that the tongue portion 19 have substantial bearing surfaces contacting the abutting surfaces of the tongues 17 and 18. Rib 19a, which is in substantial alignment with screw 33, serves this purpose in that it forms a material part of the top and bottom bearing surfaces of the fitting.

The integral columns of plastic material which extend through openings 21a and 21b bear the brunt of strain when the temple is twisted in an outward direction. However, these columns are of substantial size, and the frame is bonded to all contacting surfaces of the fitting as described hereinabove. Thus the integral columns extending through the fitting and the bond between the fitting and the frame are designed to absorb strains resulting from such movement.

Thus, I have provided a strong and reliable connection between temple 14 and endpiece 12 which is neat and attractive in appearance. Furthermore, metal parts comprising this connection are attached to the temple and endpiece in such a manner as to be able to withstand hard usage.

Referring now to Figures 8 through 15, an embodiment of the invention is shown in which the tongue of a metallic fitting is secured to a non-metallic endpiece in a vertical plane with respect to the normal position of the frame when worn. Figures 13, 14, and 15 show details of an assembled fitting, while Figures 8 to 12 show the elements which are used in constructing this embodiment. The metallic fitting shown in Figure 12, and generally indicated at 45, includes a tongue 46, a cover 47 and a pair of ears 45a and 45b. Tongue 46 is provided with an elongated opening 48, into which is snugly received the plastic insert 49 (see Figure 11).

In assembling this embodiment of the invention, the first step is to provide the construction shown in Figure 8 wherein the endpiece generally indicated at 41 is cut along a vertical plane, thereby providing a slot 40 and forming a pair of tongue portions 42 and 43. Next, tongue portions 42 and 43 are heated and bent rearwardly to form concentric arcs as shown in Figures 9 and 10. During this bending operation, the end of tongue portion 43 extends rearwardly beyond the end of tongue portion 42 (see Figure 10). Accordingly, these tongue portions are cut off even along the dotted lines so that in assembly they lie flat against the respective surfaces of metallic fitting 45.

Tongue 46 of metallic fitting 45 has substantially the same curvature as endpiece 41, and is snugly received in slot 40 with the plastic insert 49 positioned in opening 48. During assembly, metallic tongue 46 is coated with a cellulose lacquer, and insert 49 is placed in opening 48, after which endpiece 41, insert 49, and tongue 46 are coated with a plastic solvent, such as ethyl acetate. Next, the tongue and insert are placed in slot 40 between tongue portions 42 and 43, and the tongue portions are pressed together until the solvent evaporates. This securely bonds insert 49 and tongue 46 to the sides of slot 40 (Figures 13 and 14) with insert 49 becoming an integral part of the endpiece. Cover member 47 covers the exposed ends of tongue portions 42 and 43, and ears 45a and 45b form a hinged connection with a metallic fitting 51 which is secured to temple 50 in any suitable manner, such as referred to above.

In constructing frames of these embodiments, non-metallic frames are cut in the form of flat blanks from sheets of plastic material, and, if it is desired to have the endpieces curve rearwardly, they are heated and bent to the correct shape and then allowed to cool. However, in the case of extended use or if the endpieces become heated, they tend to straighten and return to the plane from which they were bent. In the constructions disclosed, this tendency is overcome by the action of the plastic inserts. The tongue portions are bent out of the planes in which they lie, and, due to the fact that they are bent along different arcs, one tongue portion extends rearwardly a greater distance than the other. Then, when the two tongue portions are bonded together in this bent position by the insert, the tongue portions hold each other rigidly. Thus they cannot straighten out, as such action would cause either the compression and shortening of tongue portion 42 or the stretching and lengthening of tongue portion 43. In this manner, a strong and durable connection has been disclosed for connecting a metallic fitting to a non-metallic end piece. Furthermore, an endpiece construction is disclosed which does not straighten under extended use or the application of heat. It will thus be seen that I have provided a thoroughly practical and efficient construction in which the several objects hereinabove referred to, as well as many others, are successfully accomplished.

As many possible embodiments may be made of the above invention, and as many changes might be made in the embodiment above set forth, it is to be understood that all matter hereinbefore set forth, or shown in the accompanying drawings, is to be interpreted as illustrative and not in a limiting sense.

I claim:

1. In eyeglass construction, in combination, a frame including a rim formed from plastic material and having an endpiece portion with a slot formed therein, a flat metal part disposed in said slot, the length of said metal part being far greater than its thickness, said metal part having an opening extending vertically therethrough, the cross-sectional area of said opening being of substantial size as compared to the flat area of said metal part, and a separate piece of plastic material disposed in and filling said opening, said piece of plastic material being bonded to the top and bottom sides of said slot throughout the entire adjacent surfaces thereof.

2. In eyeglass construction, in combination, a frame made from plastic material and having a slot formed therein so positioned that it lies in a generally horizontal plane when the frame is worn and forms a pair of spaced integrally joined projections, a metal part extending substantially throughout the length of said slot and having a non-circular opening extending vertically therethrough, the cross sectional area of said opening being of substantial size as compared to the flat area of said metal part and a separate plastic insert substantially filling said opening and bonded to both of said projections to anchor said part in position.

3. In eyeglass construction, in combination, a frame including a rim formed from plastic material and having an extension with a slot formed therein substantially in a horizontal plane when the frame is worn, a flat metal part fitting in said slot with a non-circular opening of substantial size therein extending vertically therethrough, the cross sectional area of said opening being of substantial size as compared to the flat area of said metal part, and a separate flat plastic insert of the same contour and fitting snugly in said opening, said flat plastic insert being fused to the side walls of said slot to form an integral portion of said extension extending through said opening.

4. In eyeglass construction, in combination, a frame including a rim with an extension formed from plastic material, said extension having a slot formed therein substantially in a horizontal plane when the frame is worn to form top and bottom sections of said extension, a flat metal part disposed in said slot with a pair of spaced vertical openings therein of substantial size, at least one of said openings being non-circular and having a cross-sectional area of substantial size as compared to the flat area of said metal part, and separate pieces of plastic material filling said openings and bonded to said extension.

5. In eyeglass construction, in combination, a frame including a rim with an extension formed from plastic material, said extension having a slot formed therein substantially in a horizontal plane when the frame is worn to form top and bottom sections of said extension, a flat metal part disposed in said slot with a pair of spaced vertical openings therein, the cross sectional area of at least one of said openings being of substantial size as compared to the flat area of said metal part, a separate piece of plastic material filling said last-mentioned opening and bonded to the sides of said slot, and an additional securing element connected to said top and bottom sections and extending through the other of said openings.

6. In eyeglass construction, in combination, a frame including a rim of plastic material and having an endpiece portion with a slot formed therein to provide two sections, a metal part disposed between said sections, said part having an opening extending substantially throughout the length and width thereof, and a separate insert of plastic material of substantially the same thickness as said part disposed in and completely filling said opening, said insert being bonded completely throughout its length to said sections to hold said metal part in said slot.

7. In eyeglass construction, in combination, a frame made from plastic material and having a slot formed therein so positioned that it lies in a generally horizontal plane when the frame is worn, a metal part extending substantially throughout the length of said slot and having a non-circular opening extending vertically therethrough, the cross-sectional area of said opening being of substantial size as compared to the flat area of said metal part, and a separate solid plastic insert substantially filling said opening and bonded to the sides of said slot to anchor said part in position.

HOWARD E. SPOONER.